(12) United States Patent
Micko (10) Patent No.: US 7,498,576 B2
(45) Date of Patent: Mar. 3, 2009

(54) TEMPERATURE DETECTING SYSTEM AND METHOD

(75) Inventor: Eric Scott Micko, Hong Kong (CN)

(73) Assignee: Suren Systems, Ltd., Hong Kong (CN)

( * ) Notice: Subject to any disclaimer, the term of this patent is extended or adjusted under 35 U.S.C. 154(b) by 43 days.

(21) Appl. No.: 11/609,232

(22) Filed: Dec. 11, 2006

(65) Prior Publication Data

US 2007/0187605 A1 Aug. 16, 2007

Related U.S. Application Data

(60) Provisional application No. 60/749,737, filed on Dec. 12, 2005.

(51) Int. Cl.
*G01J 5/20* (2006.01)
(52) U.S. Cl. .................... 250/338.4; 250/330
(58) Field of Classification Search ................. 250/330, 250/332, 334, 338.4
See application file for complete search history.

(56) References Cited

U.S. PATENT DOCUMENTS

| | | | |
|---|---|---|---|
| 3,974,328 A | | 8/1976 | Thomas et al. |
| 4,027,160 A | | 5/1977 | Driffield et al. |
| 4,103,847 A | | 8/1978 | Thomas et al. |
| 4,155,007 A | * | 5/1979 | Beckmann ............... 250/253 |
| 4,221,966 A | | 9/1980 | Kerr et al. |
| 4,419,692 A | * | 12/1983 | Modisette et al. ........... 348/167 |
| 4,466,748 A | * | 8/1984 | Needham ................. 374/129 |
| 4,772,875 A | | 9/1988 | Maddox et al. |
| 4,814,870 A | | 3/1989 | Crall |
| 4,874,253 A | * | 10/1989 | Pompei et al. ............. 374/121 |
| 4,952,808 A | * | 8/1990 | Turnbull et al. ........... 250/338.3 |
| 4,999,614 A | | 3/1991 | Ueda et al. |
| 5,008,522 A | | 4/1991 | Lundin |
| 5,021,660 A | | 6/1991 | Tomita et al. |

(Continued)

FOREIGN PATENT DOCUMENTS

KR 1020060103772 10/2006

OTHER PUBLICATIONS

Tej Kaushal; "Ultra-Low Cost Thermal Imaging Technology", Imaging Department/Sensors & Electronics, DERA, May 8, 2001.

(Continued)

*Primary Examiner*—David P Porta
*Assistant Examiner*—Mark R Gaworecki
(74) *Attorney, Agent, or Firm*—Stephen C. Beuerle; Procopio Cory Hargreaves & Savitch LLP (57) ABSTRACT

A temperature detection system for detecting relative or absolute temperatures of objects in a monitored area has at least one infrared (IR) detector and at least one optical element for directing IR radiation within a detector field of view onto the infrared detector. A scanning system is configured to produce relative movement between the optical element and the IR detector such that the detector field of view is scanned across a monitored area to receive IR radiation from objects in the monitored area. A signal processing module for receiving the detector output signal is configured to produce an output profile of the relative temperatures of objects in the monitored area. The IR detector may be a pyroelectric detector.

39 Claims, 5 Drawing Sheets

U.S. PATENT DOCUMENTS

| | | | |
|---|---|---|---|
| 5,091,780 A | | 2/1992 | Pomerleau |
| 5,159,200 A | * | 10/1992 | Dunbar et al. ............... 250/350 |
| 5,202,661 A | | 4/1993 | Everett et al. |
| 5,219,226 A | * | 6/1993 | James ........................ 374/124 |
| 5,283,551 A | | 2/1994 | Guscott |
| 5,299,971 A | | 4/1994 | Hart |
| 5,479,258 A | * | 12/1995 | Hinnrichs et al. ........... 356/326 |
| 5,781,108 A | | 7/1998 | Jacob et al. |
| 5,839,821 A | | 11/1998 | LeZotte |
| 6,137,407 A | | 10/2000 | Akagawa et al. |
| 6,486,778 B2 | | 11/2002 | Mahler et al. |
| 6,900,729 B2 | | 5/2005 | Paximadis et al. |
| 7,106,193 B2 | | 9/2006 | Kovach |
| 2004/0183679 A1 | | 9/2004 | Paximadis et al. |
| 2004/0233414 A1 | | 11/2004 | Jamieson et al. |
| 2005/0134450 A1 | | 6/2005 | Kovach |
| 2006/0017939 A1 | | 1/2006 | Jamieson et al. |
| 2006/0038679 A1 | | 2/2006 | Eskildsen et al. |
| 2006/0038680 A1 | | 2/2006 | Eskildsen et al. |
| 2006/0242186 A1 | | 10/2006 | Hurley |

OTHER PUBLICATIONS

International Search Report/ Written Opinion issued in PCT/US2007/025280 on Apr. 28, 2008.

* cited by examiner

TEMPERATURE DETECTING SYSTEM AND METHOD

CROSS-REFERENCE TO RELATED APPLICATION

This application claims the benefit of U.S. Provisional Application No. 60/749,737 filed Dec. 12, 2006 under 35 U.S.C. 119(e).

BACKGROUND

1. Field of the Invention

The present invention generally relates to a temperature detecting system and method, and is particularly concerned with such a system used for detecting human presence in an area, either for security purposes or for control of lighting and HVAC (Heating, Ventilation and Air Conditioning) so that such features operate only when humans are present.

2. Related Art

In order to reduce energy consumption in homes and other buildings, automatic systems are often used to control lighting and HVAC ("Heating, Ventilation and Air Conditioning") so that such comfort and convenience features operate only when humans are present. Automatic systems employ sensors to determine human presence. Commonly, several types of motion sensors are used, including Passive Infrared (PIR) motion sensors and active Doppler motion sensors (either microwave- or ultrasound-based). The commonly used sensors share a common trait: they are designed to detect human motion.

In most situations (particularly indoor situations where the climate is controlled by HVAC systems) humans are warmer than the objects that surround them (typically, walls, floors and ceilings). As infrared (IR) radiation produced by an object depends on temperature, humans typically emit more infrared (IR) radiation than do objects that surround them. This IR radiation can be monitored by detectors that are sensitive in the 8-14 micron IR wavelength range. One type of IR detector, often called a pyroelectric infrared detector, functions by means of the piezoelectric effect. Changes in IR radiation incident on its detecting element cause deformation of the element, and subsequent measurable charge transfer between two "plates" on the element. This type of detector is highly sensitive, yet only to changes in radiation intensity—not to absolute radiation intensity. Due to such high sensitivity, pyroelectric detectors are widely used in motion sensors. Motion sensors employ one or more sets of optics that direct radiation to an IR detector from a field-of-view. When a human enters and leaves the field-of-view, the detector reports, respectively, changes in IR radiation intensity, first from that of the less radiant background to that of the more radiant human, and then back to that of the background. This sequence can be interpreted by the sensor as having arisen from human motion. Since pyroelectric detectors do not respond to static radiation intensity, such sensors have no means to detect the continued presence of a human that has stopped moving.

As noted above, motion sensors are not completely sufficient for detecting human presence. For example, in a residence, a person may sit in a chair and read a book for several hours without moving enough to be detected by a motion sensor. In a business, a meeting might last for several hours without any of the participants moving significantly. In such cases, an automatic system can create a minor nuisance by extinguishing room lighting or de-activating HVAC while persons are present.

Other detectors, such as thermocouple arrays, can measure static IR radiation intensity. Such detectors can be used to detect the static presence of a "warmer" object in a room (such as a human). However, they have certain disadvantages relative to pyroelectric detectors, including relatively high cost. Thus, they are not used in commercial human presence sensors.

Therefore, what is needed is a system and method that reduces or overcomes these significant problems found in the conventional systems as described above.

SUMMARY

The present invention provides a system and method for detecting temperature or relative temperature of objects in an area, which can be used either to detect human presence as indicated by a region of elevated temperature, or simply for general temperature measurement or monitoring purposes.

According to one embodiment, a temperature measurement system is provided which comprises at least one infrared (IR) detector, at least one scanning optical assembly configured to scan the detector field of view across a monitored area, whereby the IR detector receives IR radiation from successive objects in the monitored area which are within the field of view of the detector as it is scanned across the area, and a signal processing module for receiving the detector output signal and configured to produce an output profile of the relative temperatures of objects in the monitored area. The scanning optical assembly may comprise one or more optical elements configured to direct IR radiation onto the IR detector and a drive assembly configured to move the optical element relative to the detector or the detector relative to the optical element so that the field of view of the detector scans across the monitored area.

The IR detector may be a pyroelectric detector, or may be another type of IR detector such as a thermopile detector in other embodiments. The IR detector generally works in the 8 to 14 micron range, although it may be sensitive in the range from 5 to 20 microns and may be used to detect IR radiation within this wider range.

In one embodiment, the scanning optical assembly has one or more optical elements such as mirrors directed towards the detector and mounted on a base which is connected to the drive assembly for moving the assembly back and forth so as to scan the field of view of the detector across the monitored area. More than one detector may be used in alternative embodiments so that several fields of view are scanned across the area and each scanned field of view creates a different detector signal. In this case, a two dimensional data array or picture can be produced by the signal processing module.

A pyroelectric detector responds to changes in temperature level, not static radiation intensity. By scanning the field of view of a pyroelectric detector across an area to be monitored, the relative temperatures of static objects in the area can be determined. Considered from a relative perspective, the detector's field-of-view could be visualized as static, and the presence-monitored area as being "scrolled" through the field-of-view. Objects in the monitored area might be static, yet as they are "scrolled" through the field-of-view, the detector would create signals due to any temperature differences among various objects and features within the monitored area. In typical conditions in and around buildings, a human within the area would create a very distinct signal, due to its difference in temperature from its surroundings. Since humans typically emit more IR radiation than their background, human presence will result in an elevated spot or level in the detector output signal, regardless of whether they are moving or stationary.

In one embodiment, the system includes at least one reference object which emits a known absolute IR radiation intensity and which is placed in the area to be monitored. A temperature transducer is attached to the reference object and connected to the signal processing module, and provides an output to enable the IR radiation intensity of the object to be determined. This can then be compared to the relative radiation intensity produced by scanning the IR detector over the reference object to determine ΔT. This will enable the absolute radiation intensity of all objects in the area to be determined, rather than just the relative intensity. The IR detector field of view is periodically directed towards the reference object so as to receive only IR radiation from that object. If greater accuracy is required, two reference objects operated at different temperature may be placed in the area, each having an attached temperature transducer. The two reference objects together provide a reference temperature difference for calibration of the detector's relative temperature (ΔT) measurement.

In one embodiment, the IR detector is connected to a frequency-enhanced amplifier circuit which increases the frequency response of the detector, so as to permit rapid scanning. When the detector is a pyroelectric detector, the frequency-enhanced amplifier may be a transconductance amplifier to increase the frequency response of a typical pyroelectric IR detector. Alternatively, the frequency-enhanced amplifier may be an AC amplifier high-frequency cutoff-raising circuit. An AC amplifier high-frequency cutoff-raising circuit may be used with a pyroelectric detector in voltage output mode or another type of IR detector such as a thermopile detector.

The detector in this system can be swept, or directed at one time or another, over all parts of the monitored area. The detector field-of-view movement is created by varying over time the juxtaposition of detector and optical elements directing radiation to the detector from the monitored area. As the sensor scans the monitored area, the detector creates signals due to temperature differences even among static objects and features within the monitored area. In embodiments where the detector is a pyroelectric detector which responds to change in temperature, the scanning of the detector field of view creates a kind of "motion" which allows it to produce information about relative temperatures of static objects in a monitored area. Since humans typically emit more IR radiation than their background, even non-moving humans can be detected with this system.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for detecting temperature, either for detecting human presence in an area or for general temperature sensing applications, such as signaling a location within a monitored area which has risen to a dangerous temperature. For example, one system and method as disclosed herein allows for use of an infra-red (IR) pyroelectric detector to sense moving or stationary human presence.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
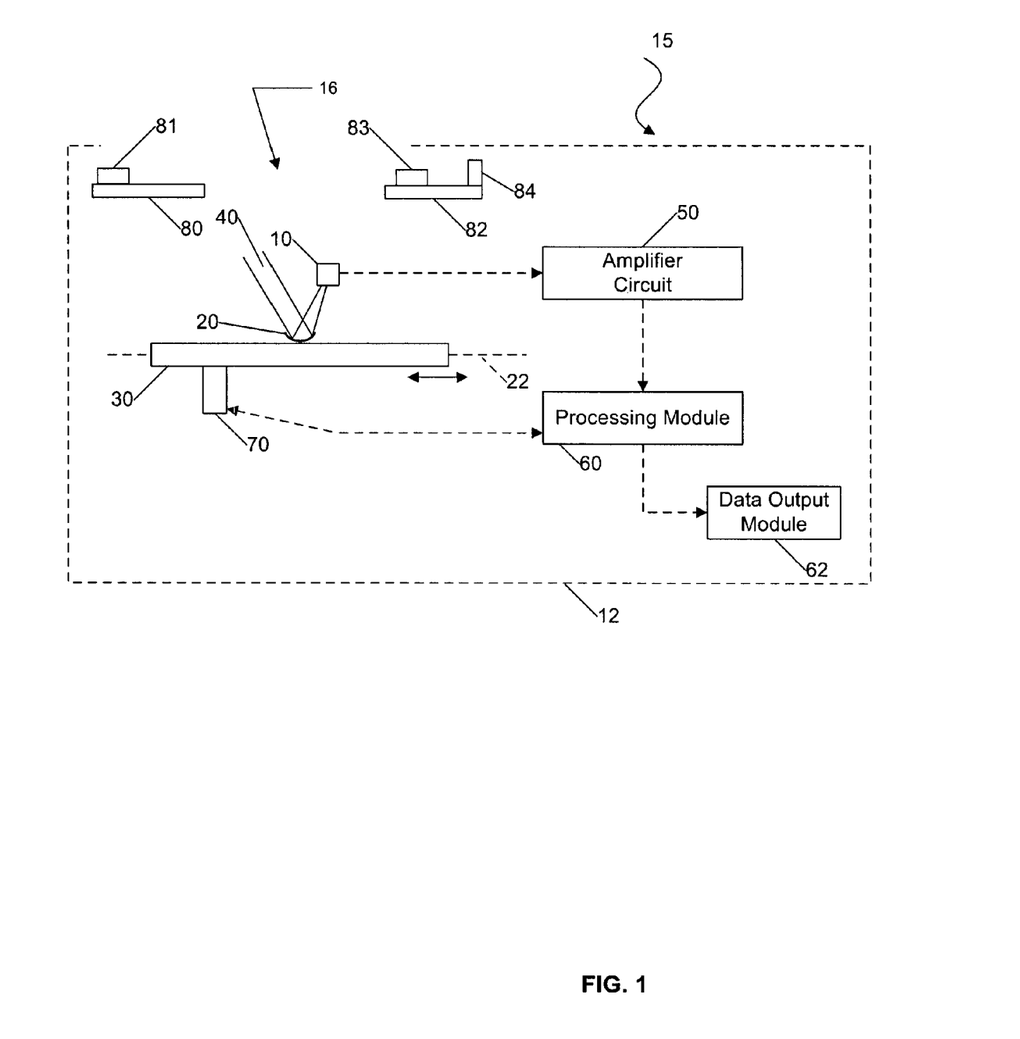
FIG. 1 is a schematic illustration of a temperature detection system according to a first embodiment, taken in a first direction.
Figure 2:
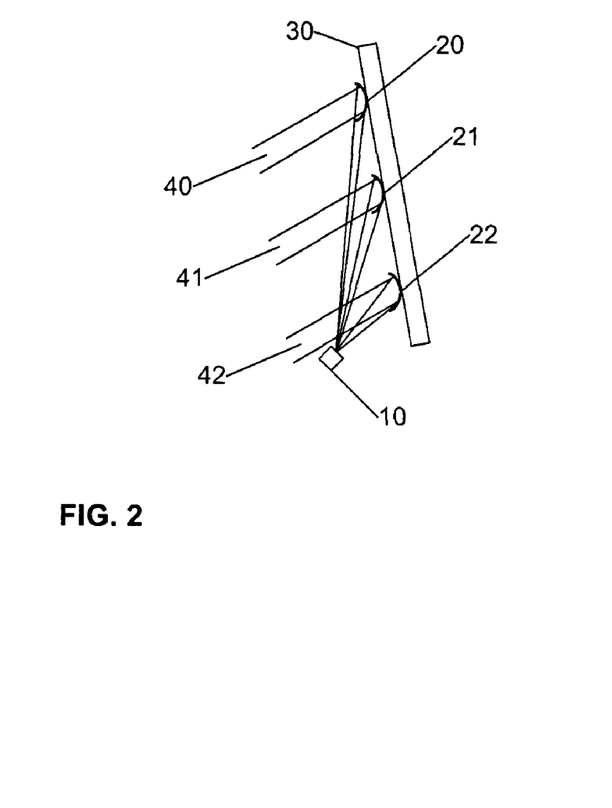
FIG. 2 is a schematic illustration of the system of FIG. 1 taken in a direction perpendicular to the first direction.

FIGS. 1 and 2 schematically illustrate a temperature detection apparatus or system 15 according to one embodiment, which may be used as a human presence detection system for controlling utilities such as lighting or HVAC, or for an intruder alarm system, or may alternatively simply be used for temperature monitoring purposes. A detector 10 is mounted in a suitable housing or support 12 and is associated with an optical scanning assembly including optical elements 20. In this embodiment, the optical elements are mounted on a movable base 30 which is driven back and forth along a predetermined linear path so as to scan the field of view of detector 10 back and forth across a monitored area. In the illustrated embodiment, the movable base 30 is driven by the drive device 70 back and forth along a line 22 near the detector 10 so as to direct infrared (IR) radiation within a field of view 40 onto the detector. Housing 12 has a window 16 for receiving IR radiation from a monitored area.

Base 30 is driven back and forth by a suitable drive or actuator 70. The drive or actuator may be a linear electromagnetic motor or the like. As the base 30 moves, the field of view 40 will be scanned back and forth across an area to be monitored, according to the angles of incidence and reflection from the optical element or elements. The housing will have a window positioned for receiving IR radiation from objects in the monitored area along the scanning path, i.e. as the field of view 40 scans across the monitored area. In one embodiment, the optical element or elements may be one or more mirrors, such as defractive, parabolic or spherical mirrors, but other optical reflective devices may be used in alternative embodiments, such as one or more lenses, which may be defractive lenses. Detector 10 in this embodiment may be pyroelectric IR detector. In another embodiment, detector 10 may be another type of IR detector such as a thermopile detector.

Although in the illustrated embodiment, the optical element or elements are moved back and forth in order to scan the field of view 40 of detector 10 across a monitored area, in alternative embodiments the detector 10 may be moved back and forth along a linear path relative to the optical element or elements, so as scan the field of view and receive IR radiation from different regions of the monitored area. The movement path of the optical element(s) or detector may be a curved path or a rotational path rather than linear in alternative embodiments.

Figure 4:
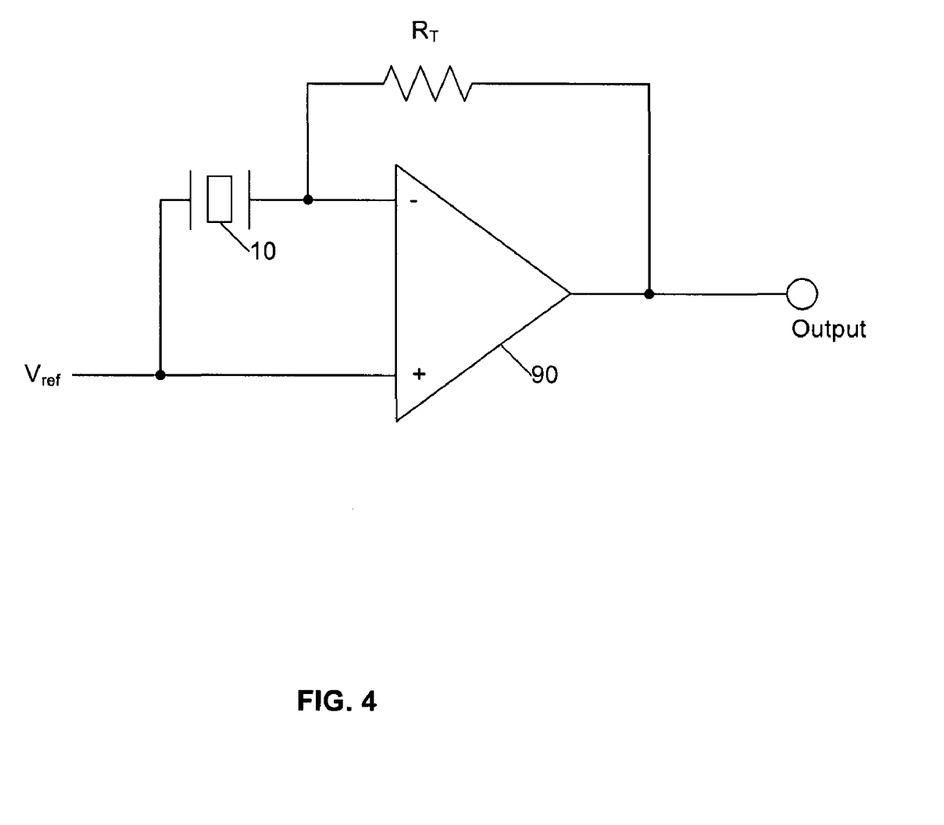
FIG. 4 is a schematic illustration of a transconductance amplifier circuit for use in the temperature detection system of the preceding embodiments.
Figure 5A:
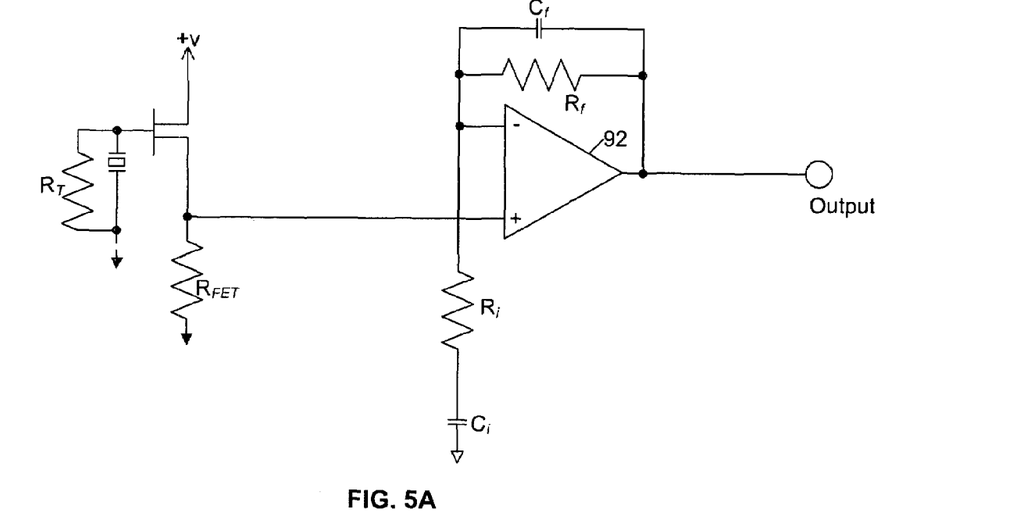
FIG. 5A is a schematic illustration of an alternative AC amplifier circuit for use in the temperature detection system of the preceding embodiments, with a pyroelectric detector connected in voltage output mode at the amplifier circuit input.
Figure 6A:
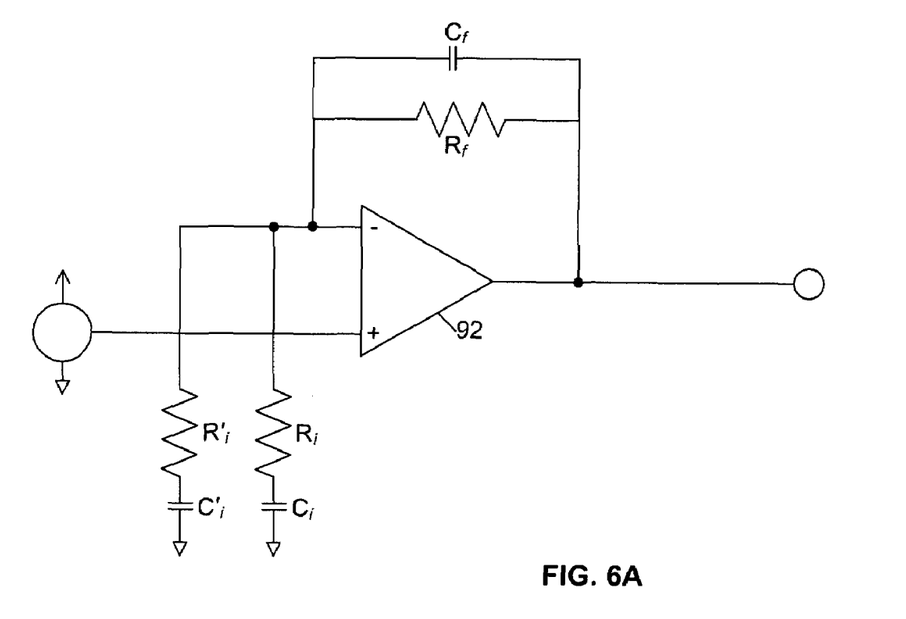
FIG. 6A is a schematic illustration of another alternative AC amplifier circuit for use in the temperature detection system of the preceding embodiments.

The detector 10 is connected to a signal amplifier circuit 50 which is designed to increase the frequency response of the detector to permit faster scanning, as well as to amplify the signal. The amplifier circuit may be a transconductance circuit in one embodiment, as illustrated in FIG. 4 and described in more detail below, or may be an AC amplifier circuit in other embodiments. FIGS. 5A and 6A illustrate alternative AC amplifier circuits which may be used as circuit 50, and which are designed to amplify the IR detector output as well as to increase frequency response.

The amplifier circuit transmits an output signal to processing module 60, which interprets the detector signal in accordance with time and the position of moving base 30, the motion of which is controlled by the processing module 60 via actuator or drive 70. The scan data (IR signal v. time/position) is output from processing module 60 to a data output module 62, which may be a video display output, a printer, or the like. Optional reference objects 80 and 82 are placed in the detector housing at the extremes of the back and forth scanning of field-of-view 40. Alternatively, these objects may be placed in the monitored area. Temperature transducers 81 and 83 may be attached to reference objects 80 and 82, and monitored by processing module 60. Processing module 60 may further control a heater 84 to maintain reference object 82 at a higher temperature than that of reference object 80. In alternative embodiments, one or both reference objects may be omitted, particularly for a monitoring system where an absolute temperature output is not needed. Processing module 60 may include algorithms that determine human presence, detect excessively high temperatures, and/or format temperature profile data so that it can be sent to a display to be viewed as a picture and interpreted by an operator.

In FIG. 2, the detector and optical elements are viewed in the scanning direction, which is perpendicular to the page as viewed in FIG. 2. This view shows three mirrors 20, 21 and 22 that create fields-of-view 40, 41 and 42. Multiple mirrors are used so that the sensor can scan a greater area while still employing the simple one-dimensional motion provided by moving base 30. A greater or smaller number of mirrors may be used in alternative embodiments, depending on the size of the area to be monitored, and only one mirror may be used in some cases. Where multiple mirrors are used, the output of the detector is a combination of the IR radiation intensity in each field of view 40, 41 and 42.

By scanning the monitored area, relative temperatures of objects and features in the area can be assessed by the processing module based on output signals received from the pyroelectric detector over the scanning path. By optionally further providing at least one reference object emitting a known absolute IR radiation intensity, the absolute IR radiation intensity of all objects and features in the monitored area may be determined. In one embodiment, the reference object is a piece of material having a known emissivity, having an attached temperature transducer which is connected to the processing module. The temperature transducer produces an output signal proportional to the IR radiation intensity of the reference object. The reference object is placed within the detector housing so that, in the process of regular scanning, the IR detector's field-of-view is from time to time directed at the reference object, so as to receive only IR radiation from the reference object. Thus, in the scanning process, the detector continually produces signals resulting from its field-of-view passing over first the reference object, and then the objects and features in the monitored area. These signals represent the IR radiation intensity difference, and thereby the temperature difference (within errors due to differing emissivities of the scanned objects), between the reference object and those in the monitored area. Thus, the temperature of objects in the monitored area can be calculated, as follows:

1. At scan reference time, obtain stable (d/dt=0) reading from reference object.
2. At scan reference time, obtain temperature (Tref) of reference object.
3. At any other time, sum (integrate dt) the detector signal; calculate $\Delta T$.
4. Sum $\Delta T$ with Tref to obtain temperature of object scanned at that time.

The sensitivity of an ordinary pyroelectric IR detector may not be as accurate as that of other widely available temperature transducers. Thus, for situations where greater accuracy is required, two separate reference objects 80 and 82 may be provided, as illustrated in FIG. 1, each operated at a different temperature, and each having an attached temperature transducer. The two reference objects together provide a reference temperature difference, for calibration of the sensor's relative temperature ($\Delta T$) measurement.

When the temperature detection system of FIGS. 1 and 2 is used for human presence detection, a moving person is detected by identifying and "registering" a "spot" of elevated temperature in the output from processing module 60 that is changing its location coordinates, at which time the sensor puts out a "presence" signal. If the spot ceases to move, it remains registered as a spot of elevated temperature as the detector field of view is scanned back and forth, and the sensor continues to put out the "presence" signal, until the spot moves out of the monitored area. A long-term "time-out" is provided to cancel the "presence" signal in the event that the spot doesn't move during a very long period, to cover the case in which the spot was erroneously registered by the sensor, having actually arisen, for example, from changing temperature of an inanimate object.

The temperature detection system 15 may also be used for general temperature measurement applications. In one embodiment, the system may be used, for example, for signaling a location within a monitored area that has reached a dangerous temperature. Such a situation could arise in a home, where an electrical socket, due to corrosion and concomitant high resistance, has risen to a high temperature—a situation that can lead to a fire. The system may be connected to a suitable alarm which is activated when a dangerously high temperature from a location within the monitored area is detected. The output can then be used to determine the location of the object which has risen to a high temperature.

Although the IR detector described in the above embodiment is a pyroelectric detector, other types of detectors may be substituted for the pyroelectric detector, and the use of one or more reference objects may still be useful for improving accuracy in the system of FIG. 1 when other types of IR detector are used, such as thermopile detectors.

Figure 3:
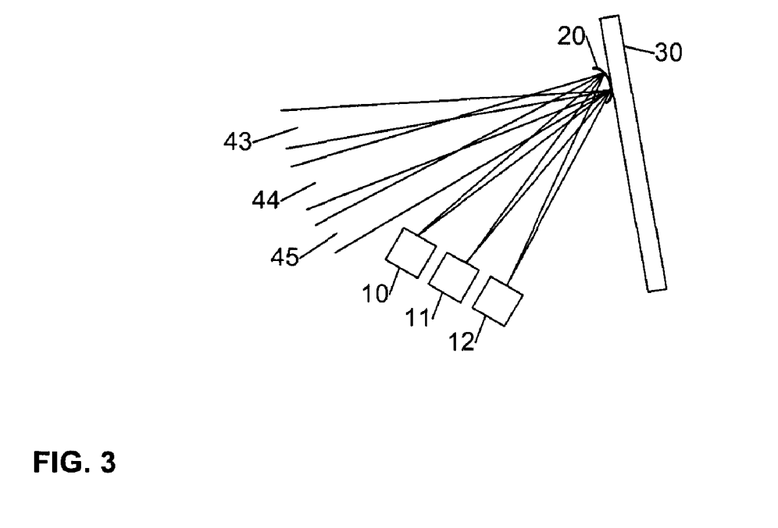
FIG. 3 is a schematic illustration of a temperature detection system according to another embodiment.

FIG. 3 illustrates a modified detector and optical element assembly which may be used in the system of FIG. 1 in another embodiment. In this embodiment, several IR detectors 10, 11 and 12 are used to generate the fields-of-view 44, 44 and 45 directed onto the respective detectors by optical element 20, which is mounted on base 30 which is moved back and forth as in the previous embodiment so as to scan each field of view across a monitored area. There may be one or more optical elements 20, which may be parabolic or spherical mirrors. The system is otherwise identical to that of FIG. 1. In the embodiment of FIG. 3, each scanned field-of-view generates a different detector signal so that a two-dimensional data array (or "picture") can be generated by the processing module 60. The IR detectors in this embodiment may be pyroelectric detectors or may alternatively comprise thermopile or other types of IR detectors.

The IR detector in any of the above embodiments may be connected to a frequency-enhanced amplifier, such as an AC amplifier in a high-frequency cutoff-raising circuit. If the IR detector is a pyroelectric detector, the frequency-enhanced amplifier may alternatively be transconductance amplifier. Thus, when one or more pyroelectric IR detectors are used in the above embodiments, they may be configured in transconductance circuits, of which the signal response versus frequency permits rapid scanning, as compared to conventional IR detector circuits, whose signals decrease with increasing frequency. An example of a suitable transconductance circuit 50 is illustrated in FIG. 4. Other examples of non-limiting transconductance circuits can be found in U.S. patent application Ser. No. 10/812,603 filed on Aug. 13, 2004 (U.S. Patent Application Publication No. 20040189149), and U.S. patent application Ser. No. 11/298,541 filed on Dec. 9, 2005 (US Patent Application Publication No. 20060152109), the contents of both of which are incorporated herein by reference.

The transconductance circuit of FIG. 4 comprises a transconductance amplifier 90 having a transconductance resistor $R_T$ connected in a feedback loop between its output and the negative input. A reference voltage is connected to the positive input, and the IR detector 10 is connected between the positive input line and the negative input of amplifier 90. In this example, detector 10 is a pyroelectric detector.

In this circuit, the detector element current passes through the resistor $R_T$ and produces a signal voltage. In this arrangement, the only frequency response limit or cut-off $f_c$ for the IR detector is its thermal response. For typical pyroelectric IR detectors, this cut off frequency is of the order of 100 Hz. Other transconductance circuits may be used in place of the transconductance circuit of FIG. 4, such as any of the transconductance circuits described in my co-pending U.S. patent application Ser. Nos. 10/812,603 and 11/298,541 referenced above.

Figure 5B:
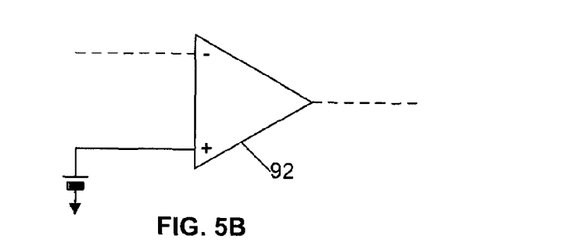
FIG. 5B illustrates a thermopile detector connected at the input of the amplifier circuit of FIG. 5A in place of the pyroelectric detector.
Figure 5C:
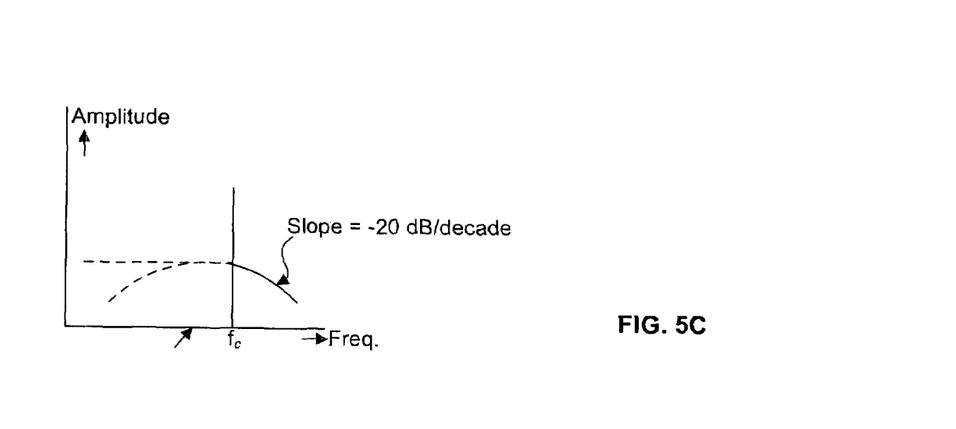
FIG. 5C is a graph illustrating the high frequency cut off of the IR detector when used with the AC amplifier circuit of FIG. 5A.

FIG. 5A illustrates an alternative frequency enhanced amplifier in an AC amplifier circuit for connection to the output of IR detector 10. In this case, detector 10 may be a pyroelectric detector connected in voltage output mode, as illustrated in FIG. 5A, or may be a thermopile detector 10A connected at the amplifier circuit signal input as illustrated in FIG. 5B. The AC amplifier circuit has an amplifier 92 with a resistor $R_f$ and a capacitor $C_f$ connected in parallel in a feedback loop between the output and negative input, and a resistor $R_i$ and a capacitor $C_i$ connected in series from the negative amplifier input to ground. In FIG. 5A, the pyroelectric IR detector 10 has a field effect transistor (FET) 94 connected as an output voltage buffer device between the detector 10 and the positive (signal) input of amplifier 92, while a resistor $R_{FET}$ is connected as the FET source load resistor. In FIG. 5B, a thermopile detector 10A is connected directly to the positive input of amplifier 92, as indicated in FIG. 5B. Other parts of the AC amplifier circuit of FIG. 5A are omitted in FIG. 5B but are identical to those shown in FIG. 5A. The IR detector high frequency cut-off $f_c$ for this circuit is illustrated in FIG. 5C.

Figure 6B:
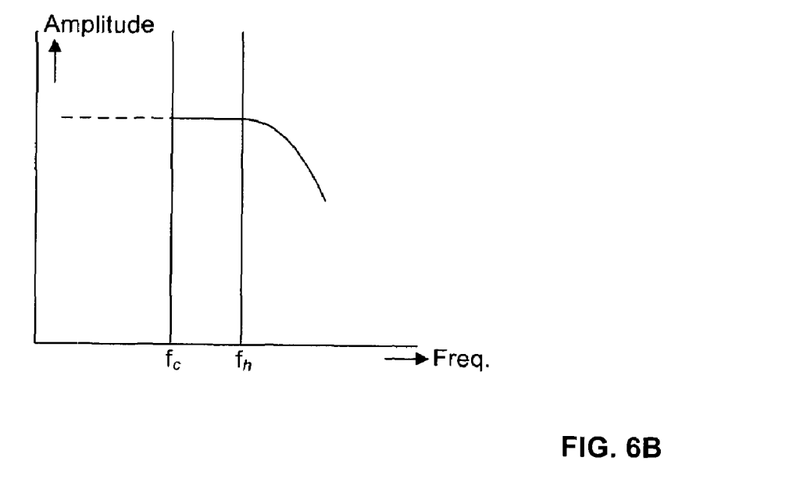
FIG. 6B is a graph illustrating the high frequency cut off of the IR detector when used with the AC amplifier circuit of FIG. 6A.

FIG. 6A illustrates an alternative frequency enhanced AC amplifier circuit for connection to a signal output of an IR detector. If the IR detector is a pyroelectric detector, it is connected in voltage output mode arrangement as in FIG. 5A to the positive amplifier input of amplifier 92 in FIG. 6A. If the IR detector is another type of detector, such as a thermopile detector, it is connected directly to the amplifier input as illustrated in FIG. 5B. In addition to the components of FIG. 5A, the circuit of FIG. 6A has an additional resistor $R_i'$ and a capacitor $C_i'$ connected in series between the negative input of amplifier 92 and ground. The frequency cut-off in this case will be increased from $f_c$ to $f_h$, as indicated in FIG. 6B, and the amplifier gain will increase between $f_c$ to $f_h$, where $$f_c = \frac{1}{2\Pi R_i C_i}$$

$$\text{and } f_h = \frac{1}{2\Pi R_i' C_i'}$$

A simple differentiator circuit could also perform this enhancement.

The detector and optics in the above embodiments may be configured in many ways, for example with detectors of one or many elements, combined with mirrors, lenses or other optical elements. Furthermore, there are many possible methods of varying over time the juxtaposition of detector and optical elements directing radiation to the detector from the monitored area. There are also many possible embodiments of scanning configurations, e.g. a single detector element that scans in two dimensions, a one-dimensional multi-element detector array that scans in one dimension, or another configurations. The method of varying over time the juxtaposition of the detector and optical elements so that the detector field of view is scanned back and forth across a monitored area may be a rotating, reciprocating, or other drive mechanism. Actuation and control of the juxtaposition may be done by electromagnetic or other means. The scan data obtained (the IR detector signal versus time/position) may be organized into one of several structures in the output device, e.g. Cartesian coordinates, polar coordinates or another structure. In any case, the data can provide location information about objects and features at different temperatures in the monitored area. One or more pyroelectric IR detectors or other types of IR detectors may be used in alternative embodiments.

The temperature detection system may be used for monitoring human presence in an area so as to control lighting and/or HVAC to operate only when humans are present, whether moving or stationary. Alternatively, as noted above, it may be used to monitor temperature of inanimate objects in an area to produce an alarm if any object (such as an electronic device or switch outlet) reaches a dangerously high temperature. In other embodiments, the system may be used for detecting intruders, who would be seen in the system output as a high intensity or temperature spot moving across a monitored area. In the latter case, the output data may be sent to a pan/tilt/zoom camera monitoring the room, so that it can be directed towards the high intensity object.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A temperature detection system, comprising:
   at least one pyroelectric infrared (IR) detector;
   an optical scanning assembly associated with the pyroelectric IR detector and configured to scan the detector field of view across a monitored area, whereby the pyroelectric IR detector receives IR radiation from successive objects in the monitored area which are within the field of view of the detector as it is scanned across the area;
   an AC amplifier high-frequency cut-off raising circuit associated with the pyroelectric IR detector for outputting a detector output signal; and
   a signal processing module for receiving the detector output signal and configured to produce an output profile of the relative temperatures of objects in the monitored area.

2. A temperature detection system, comprising:
   at least one pyroelectric infrared (IR) detector;
   an optical scanning assembly associated with the pyroelectric IR detector and configured to scan the detector field of view across a monitored area, whereby the pyroelectric IR detector receives IR radiation from successive objects in the monitored area which are within the field of view of the detector as it is scanned across the area;
   a transconductance circuit associated with the pyroelectric IR detector for outputting a detector output signal; and
   a signal processing module for receiving the detector output signal and configured to produce an output profile of the relative temperatures of objects in the monitored area.

3. The system of claim 1, wherein the IR detector is a thermopile IR detector.

4. The system of claim 3, further comprising an AC amplifier high-frequency cut-off raising circuit associated with the thermopile IR detector and having an output connected to the signal processing module.

5. The system of claim 1, further comprising a frequency-enhanced amplifier associated with the IR detector and having an output connected to the signal processing module, the frequency-enhanced amplifier being configured to amplify the detector output and to increase the frequency response of the detector.

6. The system as claimed in claim 5, wherein the amplifier is a transconductance amplifier.

7. The system as claimed in claim 5, wherein the detector is a pyroelectric detector.

8. The system according to any one of claim 1, wherein the optical scanning assembly comprises at least one optical element positioned to direct IR radiation from objects in a monitored area within the field of view onto the IR detector and a drive device configured to produce relative movement between the optical element and the IR detector such that the detector field of view is scanned across the monitored area.

9. The system as claimed in claim 8, wherein the scanning assembly further comprises a movably mounted base and the drive device is configured to drive the base on a predetermined path, the optical element being mounted on the base for receiving IR radiation from successive regions of the monitored area as the base is moved along the path.

10. The system as claimed in claim 9, wherein the optical element comprises at least one mirror.

11. The system as claimed in claim 9, wherein the optical element comprises at least one defractive mirror.

12. The system as claimed in claim 9, wherein the optical element comprises at least one lens.

13. The system as claimed in claim 9, wherein the optical element comprises at least one defractive lens.

14. The system as claimed in any one of claims 9-13, wherein the path is a linear path and the drive device is configured to drive the base back and forth along the path.

15. The system as claimed in any one of claims 9-13, wherein the path is a curved path and the drive device is configured to drive the base back and forth along the curved path.

16. The system as claimed in any of claims 9-13, wherein the path is a curved path and the drive device is configured to rotate the base along the curved path.

17. The system as claimed in claim 8, wherein the optical scanning assembly comprises a movably mounted base and the drive device is configured to drive the base on a predetermined path, the detector being mounted on the base for receiving IR radiation reflected by the optical element from successive regions of the monitored area as the base is moved along the path.

18. The system as claimed in claim 17, wherein the optical element comprises at least one mirror.

19. The system as claimed in claim 17, wherein the optical element comprises at least one defractive mirror.

20. The system as claimed in claim 17, wherein the optical element comprises at least one lens.

21. The system as claimed in claim 17, wherein the optical element comprises at least one defractive lens.

22. The system as claimed in any one of claims 17 to 21, wherein the path is a linear path and the drive device is configured to drive the base back and forth along the path.

23. The system as claimed in any one of claims 17 to 21, wherein the path is a curved path and the drive device is configured to drive the base back and forth along the curved path.

24. The system as claimed in any of claims 17 to 21, wherein the path is a curved path and the drive device is configured to rotate the base along the curved path.

25. The system as claimed in claim 8, wherein the scanning assembly has a plurality of optical elements for directing IR radiation from different fields of view onto the detector, whereby the scanning assembly scans the different fields of view across the monitored area.

26. The system as claimed in any one of claims 1 and 4-7, comprising a plurality of IR detectors and at least one optical element for directing different fields of view to the respective detectors, the signal processing module being configured to generate a two-dimensional data array based on the output signals from the detectors.

27. The system as claimed in any one of claims 1 and 4-7, further comprising an outer housing, the detector, optical scanning assembly and processing module being located in the housing, and the housing having a window for transmitting IR radiation.

28. A method of detecting relative temperatures of objects in a monitored area, comprising:

scanning the field of view of at least one pyroelectric infra red (IR) detector repeatedly across a monitored area, whereby the output of the pyroelectric IR detector represents the variation in IR radiation intensity produced by objects in the monitored area;

enhancing the frequency response of the IR detector with a frequency enhanced amplifier including an AC amplifier high-frequency cut-off raising circuit receiving the detector output signal and outputting an enhanced detector output; and processing the enhanced detector output of the IR detector to produce a scan data output corresponding to the IR detector output signal versus time/position in the monitored area.

29. The method of claim 28, further comprising the step of periodically directing the field of view of the IR detector to receive IR radiation from at least a first reference object at a known first temperature, and using the IR radiation intensity from the known object to determine temperatures of other objects in the monitored area.

30. The method of claim 29, further comprising the step of periodically directing the field of view of the IR detector to receive IR radiation from a second reference object at a known second temperature different from the first temperature, and using the IR radiation intensities from the two reference objects to determine absolute temperatures of other objects in the monitored area based on the relative intensities of IR radiation received from the other objects.

31. The method of claim 28, wherein the IR detector is a pyroelectric IR detector.

32. The method of claim 31, wherein the pyroelectric IR detector is connected in a transconductance circuit.

33. The method of claim 31, wherein the pyroelectric IR detector is connected in an AC amplifier high-frequency cut-off raising circuit.

34. The method of claim 28, wherein the IR detector is a thermopile IR detector.

35. The method of claim 34, wherein the thermopile IR detector is connected in an AC amplifier high-frequency cut-off raising circuit.

36. A temperature detection system, comprising:

at least one infrared (IR) detector;

an optical scanning assembly associated with the IR detector and configured to scan the detector field of view across a monitored area, whereby the IR detector receives IR radiation from successive objects in the monitored area which are within the field of view of the detector as it is scanned across the area, the monitored area including at least one reference object;

a temperature transducer attached to the reference object, the temperature transducer for outputting a detector output signal;

a signal processing module for receiving the detector output signal and configured to produce an output profile of the relative temperatures of objects in the monitored area, to determine a first IR radiation intensity of the object based on the output of the temperature transducer and a second, relative radiation intensity produced by scanning the IR detector over the reference object, whereby the IR radiation intensity difference can be used to determine the temperature of an object in the monitored area.

37. The system as claimed in claim 36, wherein the optical scanning assembly is configured to direct the IR detector field of view towards the reference object at periodic intervals.

38. The system as claimed in claim 36, further comprising first and second reference objects operated at different temperatures placed at spaced positions in the monitored area, a first temperature transducer attached to the first reference object, and a second temperature transducer attached to the second reference object, each temperature transducer having an output provided to the signal processing module.

39. The system as claimed in claim 38, further comprising a heater associated with the first reference object whereby the first reference object is maintained at a higher temperature than the second reference object.

* * * * *